United States Patent [19]

Izaki

[11] Patent Number: 4,537,114
[45] Date of Patent: Aug. 27, 1985

[54] AIR CONDITIONING APPARATUS FOR CARS
[75] Inventor: Katsura Izaki, Yaizu, Japan
[73] Assignee: Mitsubishi Denki Kabushiki Kaisha, Tokyo, Japan
[21] Appl. No.: 610,475
[22] Filed: May 15, 1984
[30] Foreign Application Priority Data Jun. 20, 1983 [JP] Japan .................. 58-110351

[51] Int. Cl.³ ............................. B60H 3/00
[52] U.S. Cl. .................... 98/2.06; 98/2.05; 98/2.11
[58] Field of Search ............... 98/2.06, 2.11, 2.05; 237/12.3 B, 12.3 A; 165/42

[56] References Cited
U.S. PATENT DOCUMENTS

| 2,832,277 | 4/1958 | Simons et al. | 98/2.06 |
| 3,913,834 | 10/1975 | Supper | 237/12.3 A |
| 4,222,435 | 9/1980 | Kumagai | 237/12.3 B |
| 4,271,897 | 6/1981 | Tatemoto | 237/12.3 B |

FOREIGN PATENT DOCUMENTS

| 5536255 | 9/1975 | Japan . | |
| 51614 | 4/1980 | Japan | 98/2.11 |
| 178914 | 11/1982 | Japan | 98/2.06 |
| 2100417 | 12/1982 | United Kingdom | 98/2.06 |

Primary Examiner—Henry C. Yuen
Assistant Examiner—John Kwon
Attorney, Agent, or Firm—Oblon, Fisher, Spivak, McClelland & Maier

[57] ABSTRACT

An air conditioning apparatus for cars comprises an air intake fan having internal and external air inlet ports; a heat exchanger for cooling and a heat exchanger for warming, both being arranged in series at the downstream of the intake fan and in the direction substantially perpendicular to the direction of the air flow; an air mixing chamber formed at the downstream of the heat exchanger for warming, the air intake fan having the internal and external air inlet ports, the heat exchanger for cooling, the heat exchanger for warming and air mixing chamber being all installed in one and the same casing in the order. The area of ventilation of the heat exchanger for warming is smaller than that of the heat exchanger for cooling; a by-pass route is formed in the casing and an air mixing damper is positioned in the by-pass route to regulate the flow rate of cooling air, the air mixing damper being operated in association with a warm water valve for regulating the flow rate of warm water supplied to the heat exchanger for warming.

4 Claims, 9 Drawing Figures

AIR CONDITIONING APPARATUS FOR CARS

BACKGROUND OF THE INVENTION

1. Field of the Invention

This invention relates to a compactly constructed air conditioning apparatus for cars. More particularly, it relates to an improvement in a single integral type air conditioning apparatus for cars aiming at reduction in size and weight of the apparatus as well as living comfortableness for the next-to-driver's seat by elimination of a casing whose exclusive use is a heat exchanger for cooling and a reduction in pressure loss of intake air by elimination of the ducts connecting among an air intake fan, a heat exchanger for warming and the heat exchanger for cooling.

2. Description of Prior Art

Conventionally, the air conditioning apparatus for cars has been of such a construction and layout in the vehicle cabin as shown in FIGS. 1 and 2 of the accompanying drawing. That is to say, in FIG. 1, a fan unit 4 having internal and external air inlet ports, a damper 8a, and an air intake fan 1; a cooling unit 5 having a heat-exchanger 2 for cooling and a casing; and a warming unit 6 having a heat exchanger 3 for warming, an air mixing damper 8b, an air mixing chamber a, and dampers 8c, 8d and 8e, each having its corresponding air blow-off port arranged in sequence from the side next-to-driver's seat. And, these units 4, 5 and 6 are connected to one another with ducts 7a and 7b so that they may be in the arrangement and construction in the vehicle cabin as shown in FIG. 2.

According to such arrangement and construction as mentioned above, the fan unit 4 is disposed to the extreme side of the vehicle body beyond the next-to-driver's seat, the cooling unit 5 is disposed almost in the front position of the next-to-driver's seat, and the warming unit 6 is arranged substantially at the center of the vehicle cabin. That is, all these units are layed out beneath the instrument panel 9 of the vehicle, so that one half of the instrument panel from the center part of the vehicle cabin to the side of the next-to-driver's seat is inevitably occupied by the air conditioning apparatus. In such construction of the conventional air conditioning apparatus, living comfortableness of the next-to-driver's seat is inevitably sacrificed, which gives considerable impact on the shape of the instrument panel 9. Further, the air course of the intake air becomes longer to cause increase in the pressure loss.

SUMMARY OF THE INVENTION

The present invention is intended to eliminate the disadvantage of the conventional apparatus and to provide a novel and improved air conditioning apparatus for cars.

A primary object of the present invention is to provide an air conditioning apparatus in which a heat exchanger for cooling and a heat exchanger for warming are placed adjacent each other in a single integral unit, the area of ventilation of the heat exchanger for cooling is smaller than that of the heat exchanger for warming, a by-pass route is formed in a space produced by reducing the area of ventilation of the heat exchanger for warming, an air mixing damper is positioned in the by-pass route to allow air mixing in a single integral unit having a smaller space.

Another object of the present invention is to provide an air conditioning apparatus for performing both air mixing and temperature control of air by operating in association with an air mixing damper positioned in a by-pass route and a warm water valve regulating the flow rate of warm water supplied to a heat exchanger for warming.

Still another object of the present invention is to provide an air conditioning apparatus for cars which comprises an air intake fan having internal and external air inlet ports; a heat exchanger for cooling and a heat exchanger for warming, both being arranged in series at the downstream of the intake fan and in the direction substantially perpendicular to the direction of the air flow; an air mixing chamber formed at the downstream of the heat exchanger for warming; the air intake fan having the internal and external air inlet ports, the heat exchanger for cooling, the heat exchanger for warming and air mixing chamber being all installed in one and the same casing and in order, wherein the area of ventilation of the heat exchanger for warming is smaller than that of the heat exchanger for cooling; a by-pass route is formed in the casing and an air mixing damper is positioned in the by-pass route to regulate the flow rate of cooling air, the air mixing damper being operated in association with a warm water valve for regulating the flow rate of warm water supplied to the heat exchanger for warming.

DETAILED DESCRIPTION OF THE PREFERRED EMBODIMENTS

Preferred embodiments of the present invention will be described in detail with reference to drawings.

First of all, description will be made as to a single integral type air conditioning apparatus for cars. The present invention, with reference to FIGS. 3–5.

Figure 1:
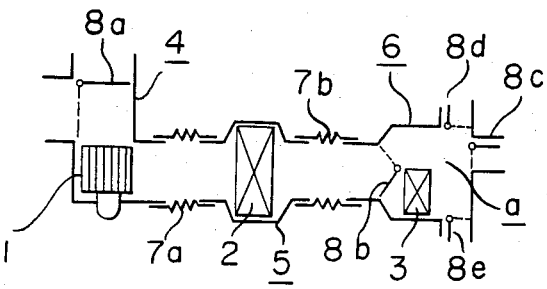
FIG. 1 is a diagram showing a conventional air conditioning apparatus for cars.
Figure 2:
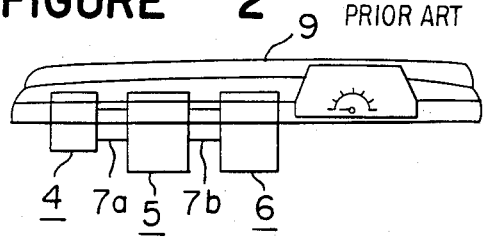
FIG. 2 is a diagram showing a state of mounting on a car the air conditioning apparatus shown in FIG. 1.
Figure 3:
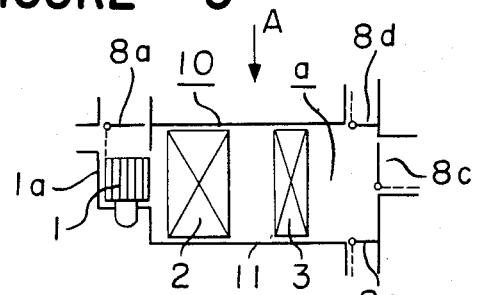
FIG. 3 is a diagram showing a single integral unit according the present invention.

As shown in FIG. 3, a casing 11 is provided with an air intake fan case 1a having internal and external air intake ports, an air mixing chamber a and air blow-off ports for blowing conditioned warm air to predetermined positions. In the casing 11, a heat exchanger 2 for cooling and a heat exchanger 3 for warming are arranged in series at the downstream of an air intake fan 1 and in the direction substantially perpendicular to the direction of air flow so that air introduced through the air take fan 1 is passed through the heat exchanger 2 for cooling and the heat exchanger 3 for warming to be fed to the air mixing chamber a and finally is blown into the car cabin from the predetermined blow-off ports. The reference numeral 10 designates a single integral unit.

Figure 4:
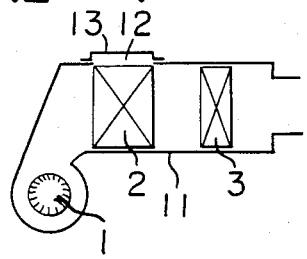
FIG. 4 is a diagram of the air conditioning apparatus shown in FIG. 3, as viewed in the direction of an arrow mark A.

Thus, the unit of the air conditioning apparatus installed in the car cabin performs all the functions, even though it is a single body, by placing the air intake fan and the heat exchanger for cooling in the single and the same casing. The heat exchanger for cooling may be put in the casing, if necessary, by constructing the casing in such a manner that as shown in FIG. 4 viewed from the arrow mark A in FIG. 3, an opening 12 and a cover 13 are provided in the casing. When the heat exchanger 2 for cooling is removed from the opening 12, the air conditioning apparatus can be used exclusively for a unit for warming operation.

Figure 5:
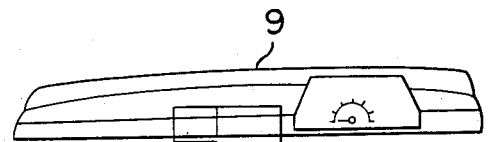
FIG. 5 is a diagram showing a state of mounting on the panel of a car the single integral unit shown in FIG. 3.

As shown in FIG. 5, the single integral unit 10 is positioned at almost the center of the instrument panel 9 of the car and the internal and external air intake fan unit and a cooling unit, which has occupied the front area of the next-to-driver's seat, are held in the single integral unit 10 with the consequence that living comfortableness of the next-to-driver's seat is remarkably improved.

Figure 6:
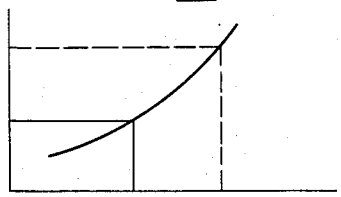
FIG. 6 is a graphical representation showing comparison of the conventional air conditioning apparatus with the single integral unit shown in FIG. 3 with respect to relationship between the distance of an air passage and pressure loss.

FIG. 6 is a graphical representation showing the relationship between the distance of an air passage and pressure loss. It is apparent from FIG. 6 that the distance of the air passage is reduced to one half or less and the pressure loss is also reduced almost one half in comparison with that of the conventional air conditioning apparatus for cars. Also the single integral unit as above-mentioned is more advantageous than the conventional apparatus in many respect; however, there are problem of space, namely since the heat exchanger for cooling and the heat exchanger for warming are placed adjacent each other in the casing, it is difficult for the unit to have air mixing function even by arranging an air mixing damper in the casing due to a limited space in the car.

The present invention has as an object to further improve the air mixing function on the premise of the single integral unit as above-mentioned in which the heat exchanger for cooling and the heat exchanger for warming are positioned adjacent each other.

An embodiment of the present invention will be described in detail with reference to FIGS. 7 to 9.

Figure 7:
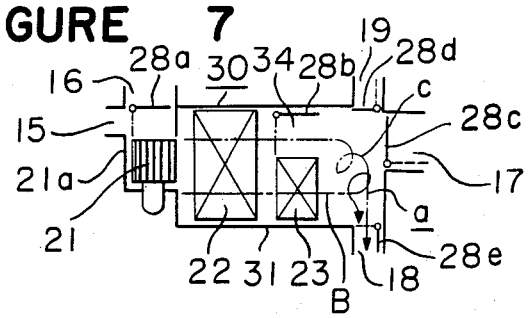
FIG. 7 is a diagram of an embodiment of the single integral unit of the present invention.

FIG. 7 shows a casing 31 provided with a fan case part 21a having internal and external air intake ports 5, 16, and air mixing chamber a and air blow-off ports 17, 18, 19 for blowing conditioned warm air to a predetermined side of the front glass, driver's seat or the next-to-driver's seat in the car cabin, these parts being formed integrally with the casing. In the casing 31, a heat exchanger 22 for cooling and a heat exchanger 23 for warming are arranged in series at the downstream of an air intake fan 21 such as a Scirocco fan and in the direction substantially perpendicular to the direction of air flow. The area of ventilation of the heat exchanger 23 for warming is made smaller than that of the heat exchanger 22 for cooling to form a space near the heat exchanger 23 for warming. A by-pass route 34 is formed by utilizing the space and an air mixing damper 28b is positioned in the by-pass route 34, thus a single integral unit 30 is constructed.

Operation of the embodiment according to the present invention will be described. Air selectively taken by the movement of an air intake port damper 28a and sucked by the actuation of the air intake fan 21 is fed to the heat exchanger 22 for cooling where it is cooled (outdoor air is introduced as it is when the heat exchanger for cooling is not installed) and then is divided into two air flows for the heat exchanger 23 for warming and the by-pass route 34 which are positioned at the downstream of the heat exchanger 22 for cooling. Air B warmed in the heat exchanger 23 for warming and cooling air (or natural air) c passed through the by-pass route 34 from the heat exchanger 22 for cooling are mixed in the air mixing chamber a and the mixed air is blown off the car cabin from a predetermined air blown-off port 17, 18 or 19 which is selected by the air blow-off damper 28c, 28d or 28e.

Figure 8:
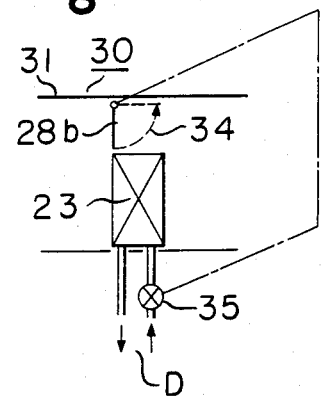
FIG. 8 is a diagram showing the operation of an air mixing damper 8b and a warm water valve 15 in the unit as shown in FIG. 7.

Although the temperature of the blown-off air can be controlled by adjusting the degree of opening of the air mixing damper 28b, namely, the flow rate of the cooling air or natural air, air mixing property and temperature control for the air introduced can be effectively obtained by operating the air mixing damper 28b positioned in the by-pass route 34 in association with a warm water valve 35 for regulating the flow rate D of a warm water flowing to the heat exchanger 23 as shown in FIG. 8.

The relationship between the air mixing damper 28b and the warm water valve 35 will next be described. When the air mixing damper 28b completely closes the by-pass route 34, the warm water valve 35 is entirely opened and the flow rate of the warm water for the heat exchanger 23 for warming becomes maximum. Namely, this state represents the maximum warming operation. When the air mixing damper 28b entirely opens the by-pass route 34, the warm water valve 35 is completely closed whereby the flow rate of the warm water is zero, namely, it is in the maximum cooling operation. When the air mixing damper 28b is brought to the intermediate position, the warm water valve 35 is also partly opened with the consequence that only a predetermined amount of warm water flows into the heat exchanger 23 for warming and the thus obtained warm air is mixed with the cooling air in the air mixing chamber a to be blown-off into the car cabin.

Figure 9:
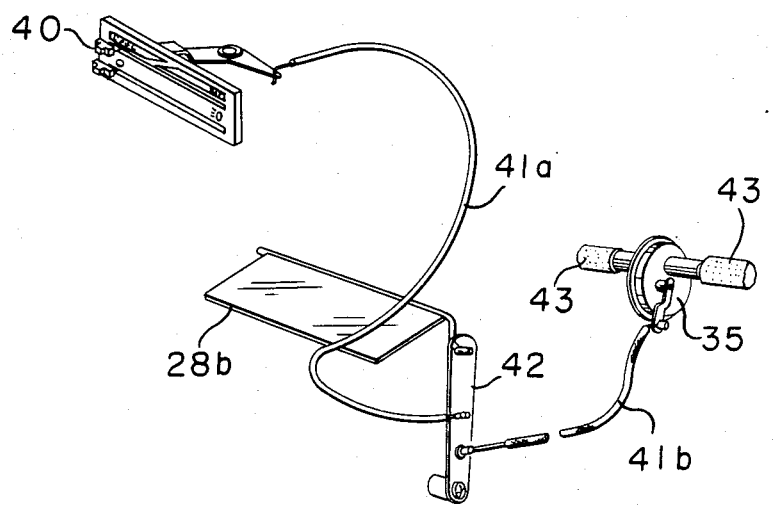
FIG. 9 is a perspective view of parts operating in association with each other of an embodiment according to the present invention.

FIG. 9 shows, as an example, a structure linking the air mixing damper 28b to the warm water valve 35. The air mixing damper 28b is connected to the one and of an arm 42. A wire cable 41a connects the arm 42 to an operating lever 40 for temperature control and a wire cable 41b connects the arm 42 to the warm water valve 35. The reference numerals 43 designate warm water hoses. When the operating lever 40 for temperature control is moved on the cooling operation side, the arm 42 is moved through the wire cable 41a whereby the air mixing damper 28b opens the by-pass route 34. On the other hand, the arm 42 is adapted to open and close the warm water valve 35. When the air mixing damper 28b is moved at a position to entirely open the by-pass route 34, the warm water valve 35 entirely closes a warm water passage through the heater hoses.

Briefly, in accordance with the present invention, there are obtainable both an air mixing property and temperature control of air by providing a single integral unit having a heat exchanger for cooling and a heat exchanger for warming disposed adjacent each other. The construction of the single integral unit is such that the area of ventilation of the heat exchanger for warming is made smaller than that of the heat exchanger for cooling, a by-pass route is formed in a space obtained by reducing the area of ventilation of the heat exchanger for warming and an air mixing damper is positioned in the by-pass route to thereby allow air mixing in the single integral unit having a small space, the air mixing damper positioned in the by-pass route being operated in association with a warm water valve for regulating the flow rate of warm water supplied to the heat exchanger for warming.

I claim:

1. An air conditioning apparatus for cars comprising:
an air intake fan having internal and external air inlet ports;
a heat exchanger for cooling and a heat exchanger for warming, both of said heat exchangers being arranged in series downstream of said intake fan and extending in a direction substantially perpendicular to the direction of the air flow;
and air mixing chamber formed downstream of said heat exchanger for warming, said air intake fan, said heat exchanger for cooling, said heat exchanger for warming and said air mixing chamber being all installed in order in one and the same casing, wherein the area of ventilation of said heat exchanger for warming is smaller than that of said heat exchanger for cooling;
a by-pass route formed in said casing; an air mixing damper positioned in said by-pass route, said air mixing damper having a pivot arm for opening and closing said air mixing damper; and
a warm water valve provided in said casing to regulate the flow rate of warm water supplied to said heat exchanger for warming,
wherein said warm water valve for regulating the flow rate of warm water is connected to said pivot arm through a first wire cable and a manual operating lever for temperature control is connected to said pivot arm through a second wire cable, said manual operating lever thereby operating both said warm water valve and said air mixing damper,
wherein said first and second cables are linked to said air mixing damper in such a manner that when said warm water valve is entirely opened, said air mixing damper is entirely closed and when said warm water valve is entirely closed, said air mixing damper is entirely opened.

2. The air conditioning apparatus for cars according to claim 1, wherein said by-pass route is formed at a lateral side of said heat exchanger for warming.

3. The air conditioning apparatus for cars according to claim 2, wherein said air mixing damper is provided in said by-pass route in such a manner that when said by-pass route is entirely closed, said air mixing damper extends on the line of extension of an upstream end surface of said heat exchanger for warming, and when said air mixing damper is positioned to open said by-pass route, said air mixing damper is turned from said position of the line of extension of the upstream end surface and into said by-pass route.

4. The air conditioning apparatus for cars according to claim 3, wherein the length of said air mixing damper is substantially equal to the thickness of said heat exchanger for warming.

* * * * *